(12) United States Patent
Linford

(10) Patent No.: US 11,964,717 B1
(45) Date of Patent: Apr. 23, 2024

(54) OFF-ROAD TRAILER

(71) Applicant: Kent Linford, Rexburg, ID (US)

(72) Inventor: Kent Linford, Rexburg, ID (US)

( * ) Notice: Subject to any disclaimer, the term of this patent is extended or adjusted under 35 U.S.C. 154(b) by 0 days.

(21) Appl. No.: 18/497,129

(22) Filed: Oct. 30, 2023

Related U.S. Application Data

(60) Provisional application No. 63/527,862, filed on Jul. 20, 2023.

(51) Int. Cl.
*B62D 63/06* (2006.01)
*B62D 63/08* (2006.01)

(52) U.S. Cl.
CPC ........... *B62D 63/064* (2013.01); *B62D 63/08* (2013.01)

(58) Field of Classification Search
CPC ..... B62D 63/064; B62D 63/08; B62D 63/062
See application file for complete search history.

(56) References Cited

U.S. PATENT DOCUMENTS

| | | | | |
|---|---|---|---|---|
| 2,912,274 | A * | 11/1959 | Falkner | B60P 3/34 |
| | | | | D12/104 |
| 5,383,703 | A * | 1/1995 | Irvine, III | B62D 63/061 |
| | | | | 296/24.45 |
| 6,283,537 | B1 * | 9/2001 | DeVore, III | B60P 3/341 |
| | | | | 296/168 |
| 6,557,882 | B2 * | 5/2003 | Harrington | B60D 1/143 |
| | | | | 280/415.1 |
| 6,739,617 | B1 * | 5/2004 | Martin | B60P 3/341 |
| | | | | 280/789 |
| 6,923,475 | B1 * | 8/2005 | Martin | B62D 21/20 |
| | | | | 280/789 |
| 7,055,848 | B1 * | 6/2006 | James | B62K 27/02 |
| | | | | 280/401 |
| 7,165,779 | B2 * | 1/2007 | Badger | B60P 3/07 |
| | | | | 280/415.1 |
| 7,178,857 | B2 * | 2/2007 | Williams | B60P 3/341 |
| | | | | 296/159 |
| 7,322,637 | B2 * | 1/2008 | Smith | B60P 3/341 |
| | | | | 296/159 |
| 7,681,941 | B2 * | 3/2010 | Freeman | B60P 3/341 |
| | | | | 296/168 |
| 7,789,452 | B2 * | 9/2010 | Dempsey | B60P 3/42 |
| | | | | 296/173 |
| 7,810,866 | B2 * | 10/2010 | Dempsey | B62D 63/062 |
| | | | | 296/173 |
| 8,292,558 | B2 * | 10/2012 | Benesch | B60P 3/07 |
| | | | | 410/4 |
| 9,340,087 | B2 * | 5/2016 | Atkinson | B62D 33/037 |
| 9,475,529 | B2 * | 10/2016 | Leisner | B60P 1/435 |
| 10,023,261 | B2 * | 7/2018 | Kilcrease | B62K 27/04 |
| 10,668,952 | B1 * | 6/2020 | Stanley, Jr. | A01B 45/02 |

(Continued)

*Primary Examiner* — Kevin Hurley
*Assistant Examiner* — Michael R Stabley

(57) ABSTRACT

An off-road trailer includes a lower frame, a housing positioned on the lower frame, an extendible trailer tongue with a ball hitch receiver, an upper frame positioned above an upper surface of the housing, a rear frame, and at least two wheels. The upper frame and housing may store off-road gear, such as camping accessories. The housing may have one or more retractable platforms that may receive additional gear. Due to the configuration of the lower frame and the wheels, the trailer may be configured to traverse numerous types of terrain due to its lightweight frame and maneuverability.

1 Claim, 13 Drawing Sheets

(56) References Cited

U.S. PATENT DOCUMENTS

2003/0222431 A1* 12/2003 Crosby ................ B62D 63/061
                                                                        280/656
2005/0104324 A1* 5/2005 Richard ................... B60D 1/07
                                                                        280/491.1

* cited by examiner

OFF-ROAD TRAILER

CROSS-REFERENCE TO RELATED APPLICATIONS

This application claims the benefit of U.S. Provisional Application Ser. No. 63/527,862, filed on Jul. 20, 2023, which is incorporated herein by reference.

TECHNICAL FIELD

The present disclosure relates to a trailer that can be taken off-road. More particularly, the present disclosure relates to an off-road trailer that can be coupled to a side-by-side vehicle, or other type of off-road vehicle, allowing a user to traverse any type of terrain with off-road gear.

BACKGROUND

Off-road vehicles have been an important part of modern-day society. These vehicles have been used from government agencies to the recreational user and allow individuals to reach destinations that would not be reachable with a conventional vehicle. Off-road vehicles may include SUVs, trucks, and the recently created side-by-side vehicles. While many of these off-road vehicles are used for daily commutes or labors, individuals often use these types of vehicles for recreational use, meaning individuals may take their off-road vehicles on long excursions into remote regions of the world.

Excursions into remote areas at times last for multiple days and individuals may attempt to pack all of their gear into the off-road vehicle. However, off-road vehicles are often limited in storage when it comes to carrying necessary gear to survive these excursions. Accordingly, individuals and companies have attempted to create storage containers and trailers to increase storage space. Some of these attempts have many shortcomings that prevent excursions into rough regions. In particular, off-road trailers on the market today fail to provide stability, maneuverability, and clearance to traverse rough roads. In addition, many of these off-road trailers are not optimized for side-by-side vehicles and are usually too heavy and cumbersome for these vehicles and other small vehicles, such as small SUVs, to pull up steep hills and over rocky or muddy terrain.

Accordingly, there is a need for an off-road vehicle that is compatible with side-by-side vehicles, is lightweight, and highly maneuverable. The present invention seeks to solve these and other problems.

SUMMARY OF EXAMPLE EMBODIMENTS

In one embodiment, an off-road trailer includes a lower frame, a housing positioned on the lower frame, an extendible trailer tongue with a ball hitch receiver, an upper frame positioned above an upper surface of the housing, a rear frame, and at least two wheels. The lower frame may comprise a main frame and supports that are fastened thereto at various angles so as to provide stability and support. The main frame may comprise a first side, a second side, a front, and a back. The first side and the second side may each comprise fastening members to receive rachet straps. The front of the main frame and housing may include a spare tire and fuel container. Furthermore, the front may receive a first upper frame support and a second upper frame support that couples to the upper frame.

The housing may be coupled to the lower frame. The housing may include a door that is hingedly coupled thereto and a latch to secure the door. In addition to the latch, door fasteners may be positioned on the housing and configured to secure the door to the housing. The rear frame may be coupled to the main frame and extend vertically so as to be proximate a rear side of the housing. The housing may be coupled to the rear frame with fasteners. The rear frame provides additional strength and structural stability to the trailer.

In addition, the rear frame may comprise a first and a second bracket on the first side and a third and a fourth bracket on the second side. The first and second brackets may receive a first tire and a first wheel structure that includes a first arm and a second arm. The first and second arms may extend outward from the rear of the main frame. Positioned between the first and second arms is a first wheel with a first axle. A first shock-absorbing bracket may be coupled to the first and second arms. The third and fourth brackets may receive a second tire and a second wheel structure that includes a third arm and a fourth arm. The third and fourth arms may extend outward from the rear of the main frame. Positioned between the third and fourth arms is a second wheel with a second axle. A second shock-absorbing bracket may be coupled to the third and fourth arms. The trailer may further comprise a first shock coupled to the rear frame at one end and the first shock-absorbing bracket at an opposite end, and a second shock coupled to the rear frame at one end and the second shock-absorbing bracket at an opposite end. The first and second shocks may be adjustable shocks that can be adjusted based on terrain. Furthermore, the rear frame may comprise a hingedly coupled platform that may be folded up and secured to the housing via a fastener. The platform may be configured to receive water canisters or any other type of gear.

DETAILED DESCRIPTION OF EXAMPLE EMBODIMENTS

Figure 1:
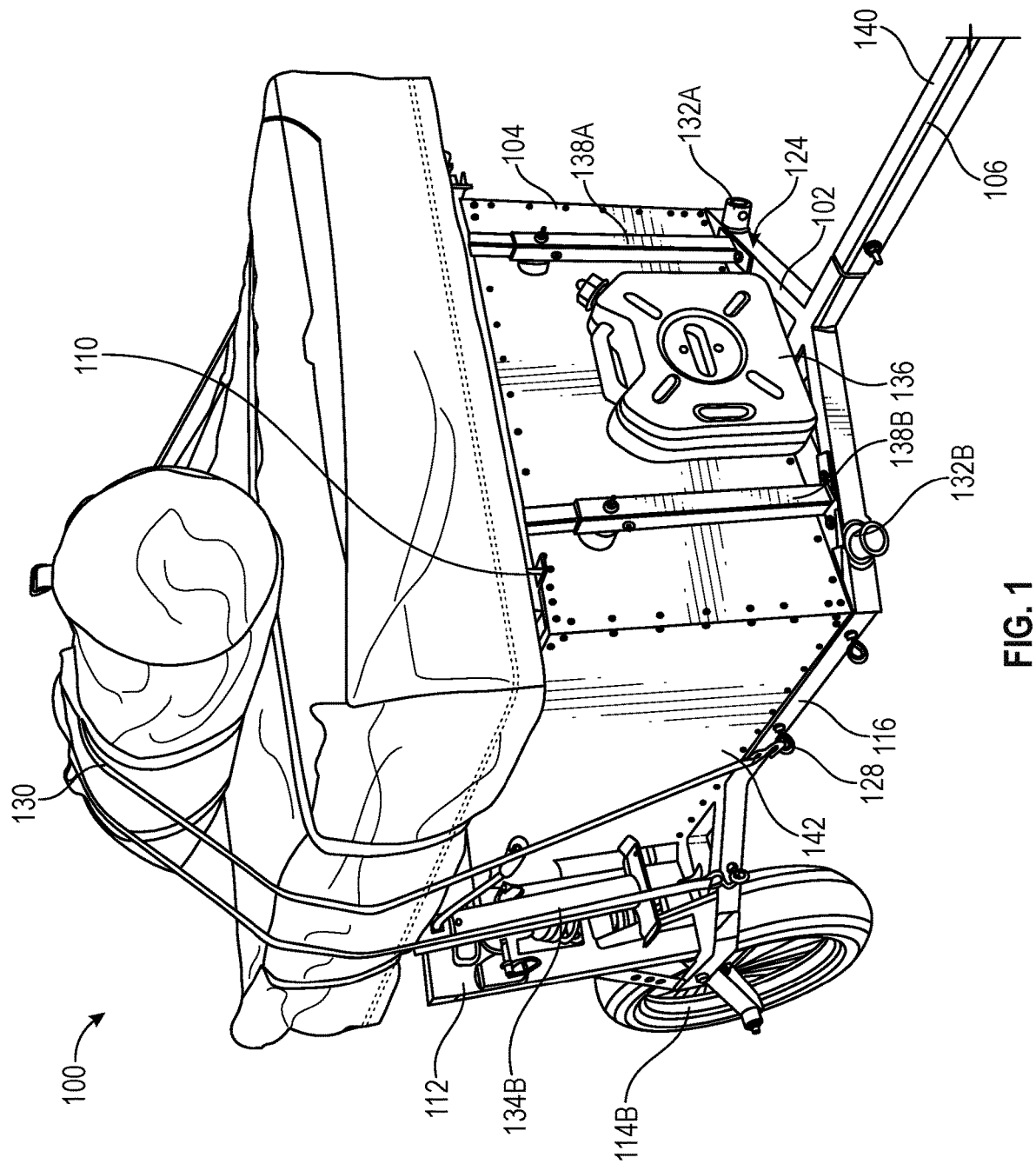
FIG. 1 illustrates a front, left-side perspective view of an off-road trailer.
Figure 2:
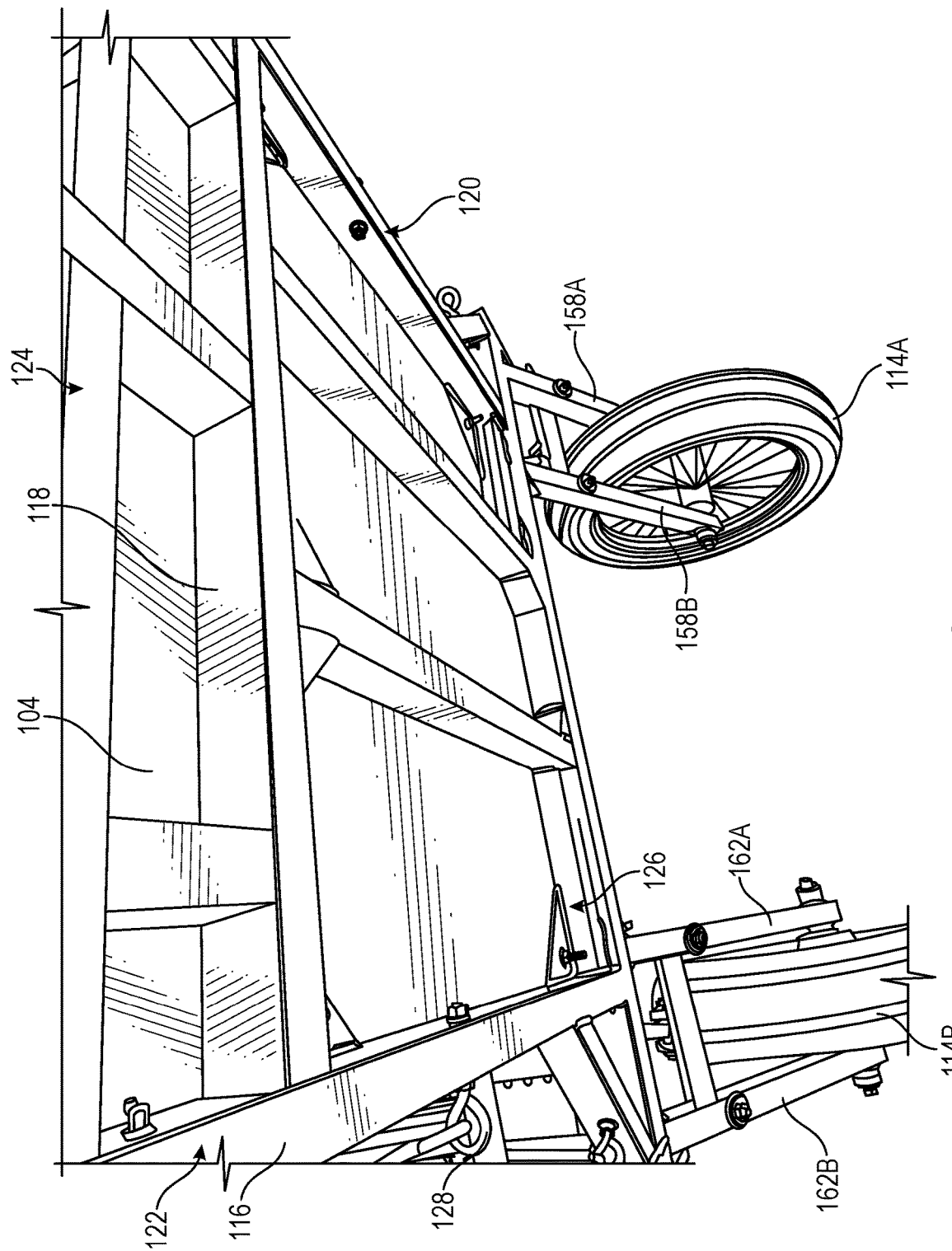
FIG. 2 illustrates a bottom perspective view of an off-road trailer
Figure 3:
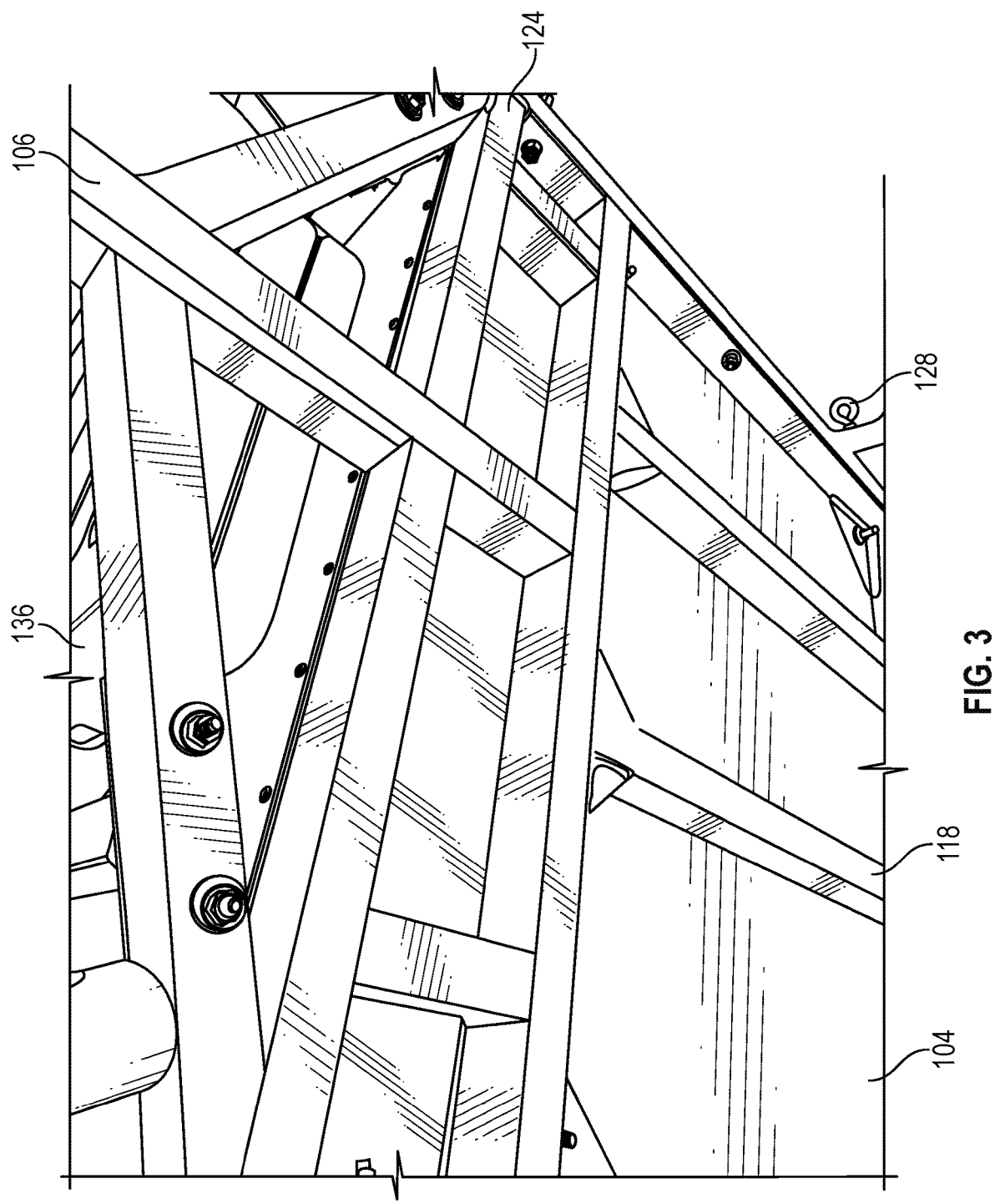
FIG. 3 illustrates a front, bottom perspective view of an off-road trailer

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for an off-road vehicle that is compatible with side-by-side vehicles, is lightweight, and highly maneuverable. The present invention seeks to solve these and other problems.

Off-road vehicles have been an important part of modern-day society as well as trailers towed by these types of vehicles. Due to the increase in individuals recreating, many have sought vehicles and trailers that can take them to majestic locations off of paved roads. Accordingly, individuals have sought for vehicles that can handle such roads as well as trailers that can withstand difficult terrain.

Trailers have evolved over the years to address the needs of off-roaders and the challenging landscapes that are crossed. Even with the evolution of trailers, there are still many shortcomings with off-road trailers. Some of these shortcomings come from off-road trailers on the market today failing to provide stability, maneuverability, and clearance to traverse rough roads. In addition, many off-road trailers are not optimized for side-by-side vehicles and are usually too heavy and cumbersome for these vehicles and other small vehicles.

The off-road trailer described herein comprises frames, a housing, at least two wheels, and shock-absorbing mechanisms. The housing may allow a user to store numerous items therein for off-road adventures. Due to the lightweight frames and housing, a side-by-side vehicle may pull the trailer to numerous locations and over various terrains, where conventional or other similar types of trailers would not be successful.

As shown in FIGS. 1-4, in one embodiment, an off-road trailer 100 (hereinafter the "trailer") includes a lower frame 102, a housing 104 positioned on the lower frame 102, an extendible trailer tongue 106 with a ball hitch receiver 108, an upper frame 110 positioned above an upper surface of the housing 104, a rear frame 112, and at least two wheels 114A, 114B (e.g., a first wheel and a second wheel).

The lower frame 102 may comprise a main frame 116 and supports 118 that are fastened thereto at various angles so as to provide stability and support. The lower frame 102 may be manufactured from a steel material, whether tubular or square-shaped. In some embodiments, the lower framer 102 may be manufactured from aluminum, carbon fiber, or any other type of material known in the art. The main frame 116 may comprise a first side 120, a second side 122, a front 124, and a back 126. The first side 120 and the second side 122 may each comprise fastening members 128 to receive rachet straps 130 that hold down gear, such as tents, sleeping pads, and clothing. The rachet straps 130 may be able to extend from the first side 120 of the main frame 116 to the second side 122 of the main frame 116 over the housing 104, thereby securely holding any gear to the upper frame 110 and housing 104. The fastening members 128 may include eye bolts or any other fastening mechanism capable of receiving rachet straps or ropes.

Referring to FIG. 1, the front 124 of the main frame 116 may comprise a first and a second protrusion 132A, 132B that may each be generally cylindrically shaped. The first and second protrusions 132A, 132B may be configured to receive a first and a second trailer jack 134A, 134B to help stabilize the trailer 100. For example, once the off-road vehicle is parked, a user may detach the trailer 100 and secure the first and second trailer jacks 134A, 134B to the first and second protrusions 132A, 132B, respectively, creating four points of contact with the ground: both wheels 114A, 114B and the first and second trailer jacks 134A, 134B. When not in use, the first and second trailer jacks 134A, 134B may be fastened to the rear frame 112 via pins, nuts and bolts, or any other type of fastening mechanism. In some embodiments, the front 124 of the main frame 116 and a front of the housing 104 may include a spare tire 135 (shown in FIG. 13) and fuel container 136 coupled thereto. Furthermore, the front 124 may receive a first upper frame support 138A and a second upper frame support 138B, where both may couple to and provide support to the upper frame 110.

Figure 4:
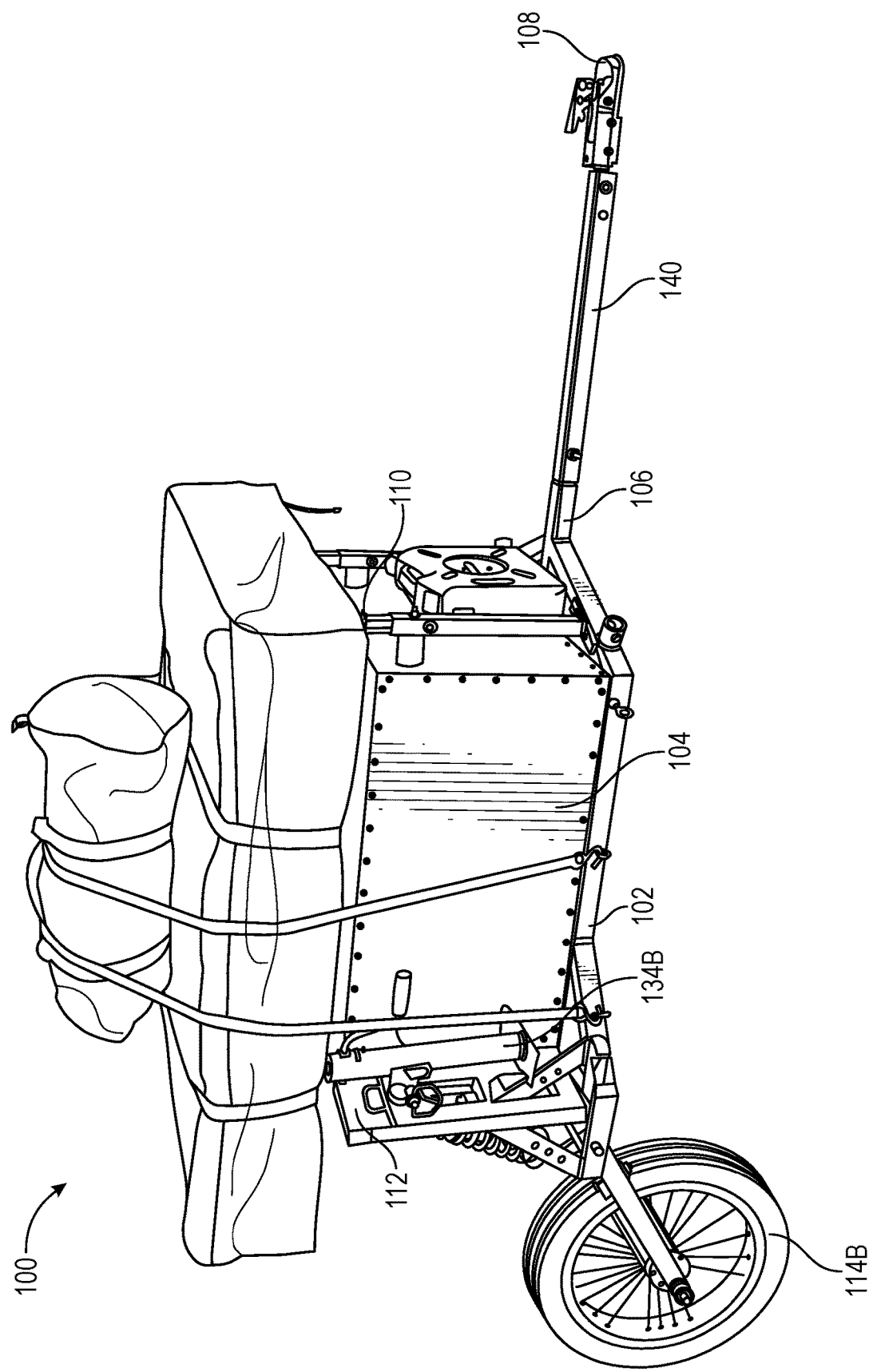
FIG. 4 illustrates a left, side perspective view of an off-road trailer.

Referring to FIG. 4, the extendible trailer tongue 106 may comprise a tongue member 140 that may be removably attachable and adds length to the trailer 100. If a user desires to decrease the length of the trailer 100, the user may remove the tongue member 140 and attach the ball hitch receiver 108 to the shortened extendible trailer tongue 106. It will be appreciated that portions of the ball hitch receiver 108 may be a capable of rotating 360 degrees to prevent the off-road vehicle from rolling over if the trailer 100 were to tip.

Figure 5:
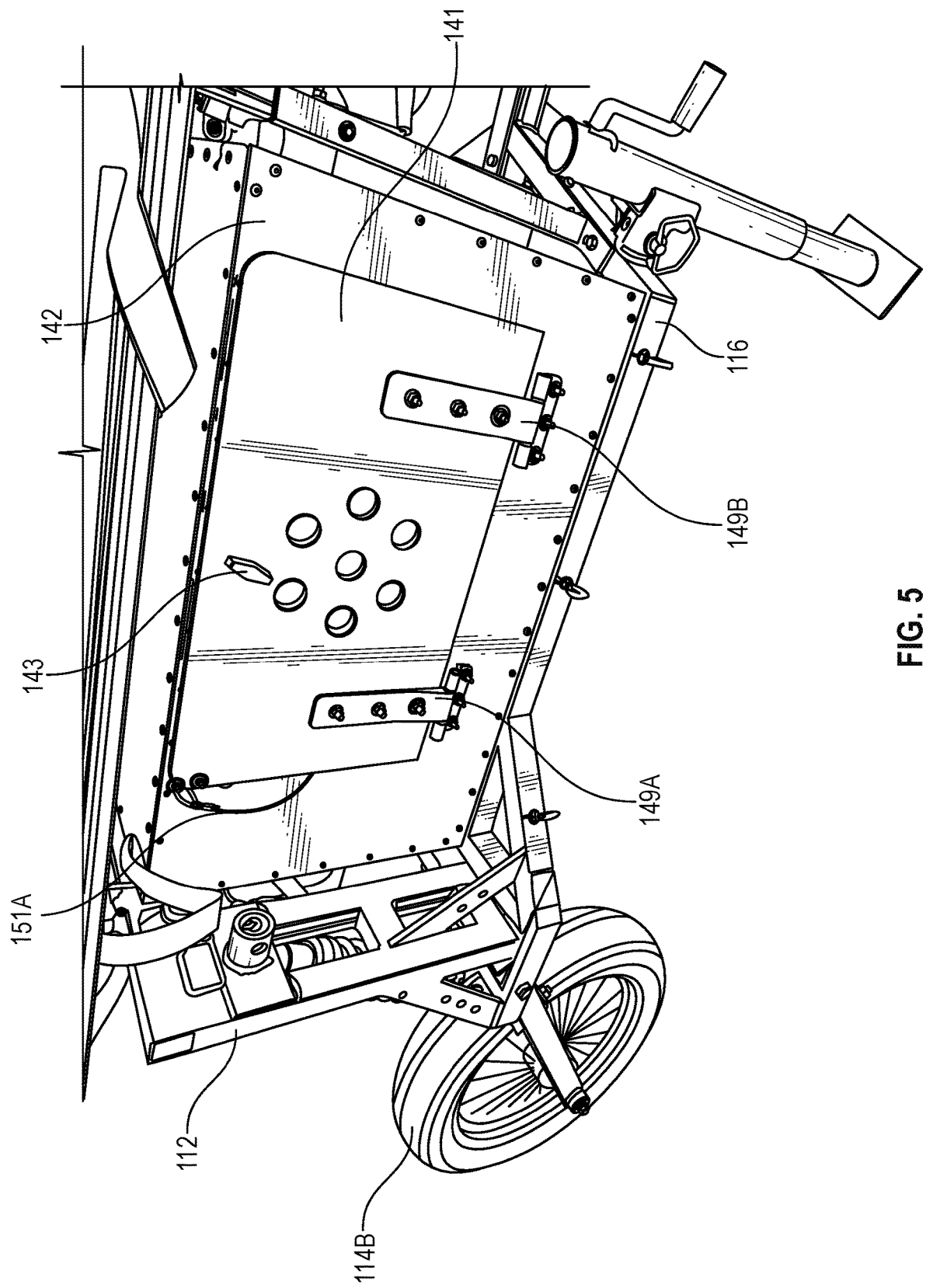
FIG. 5 illustrates a left, side perspective view of a housing of an off-road trailer.
Figure 6:
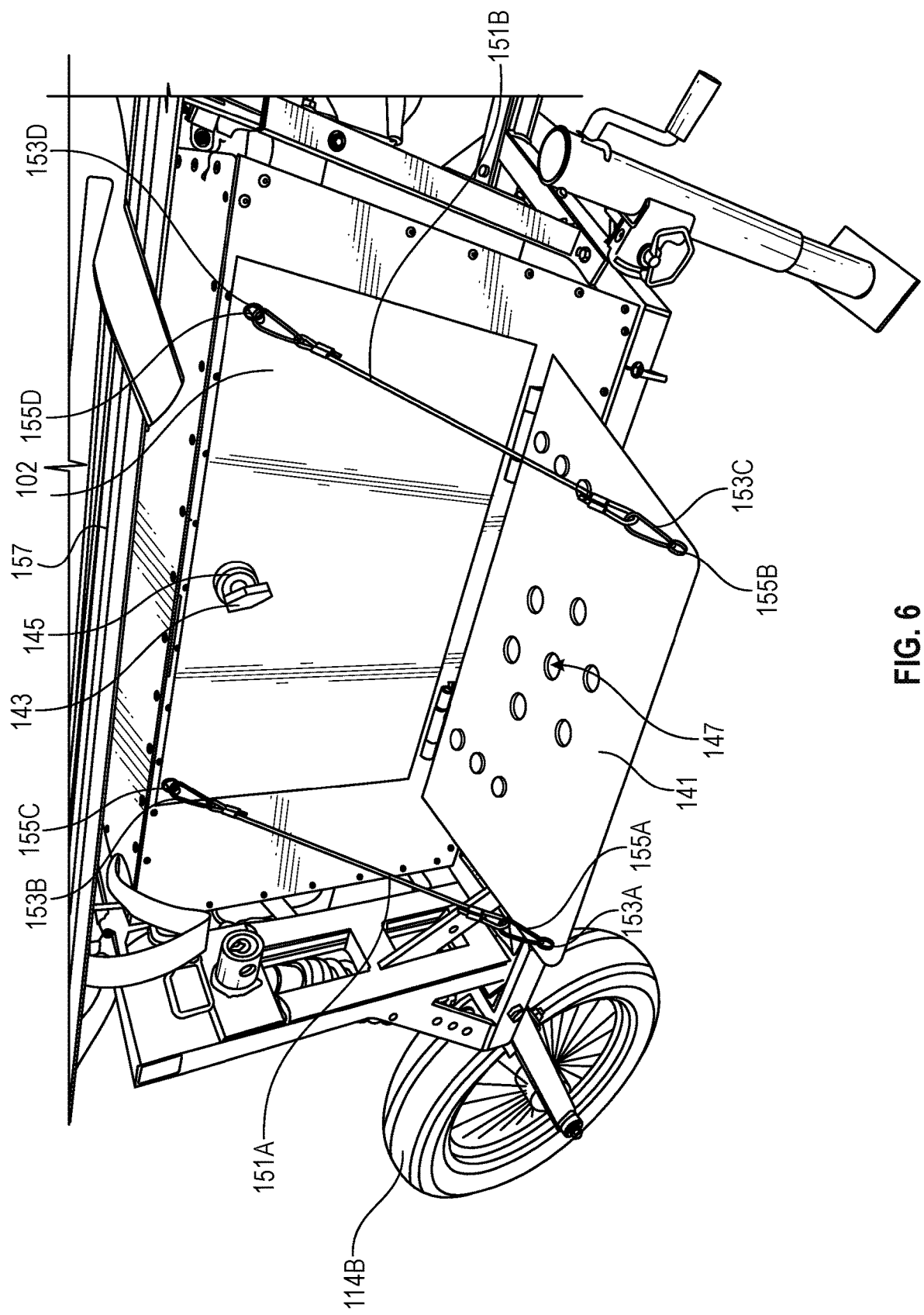
FIG. 6 illustrates a left, side perspective view of a housing of an off-road trailer.

As shown in FIGS. 5-6, the housing 104 may be coupled to the lower frame 102 with bolts and nuts. Other securement mechanisms may include welding. The housing 104 may comprise panels 142 that may be manufactured out of an aluminum material, or any other type of material, such as steel or plastic. The panels 142 may be fastened together via rivets. In some embodiments, the panels 142 may be fastened together via welding or other securement mechanisms. In some embodiments, the housing 104 may comprise a hingedly coupled first platform 141 that can be secured against the housing 104, with a platform fastener 143 and a platform spacer 145, or other types of fastening mechanisms, for travel or placed in a downward, resting position so as to create an area to place a propane stove, cooking items, or any other type of gear. The platform 141 may be manufactured from aluminum, plastic, steel, or any other type of material. Further, the platform 141 may comprise a plurality of apertures 147 that allow the platform 141 to be lighter in mass weight. The platform 141 may comprise a first hinge 149A and a second hinge 149B on a lower surface. The platform 141 may be capable of moving from the resting position, with the platform 141 at a 90-degree angle to the housing 104, and a secured position, with the platform 141 contacting and secured against the housing 104. When the platform 141 is in a resting position, it is held in place via a first tether 151A with a first fastener 153A (e.g., a carabiner) and a second fastener 153B (e.g., a carabiner) and a second tether 151B with a third fastener 153C (e.g., a carabiner) and a fourth fastener 153D (e.g., a carabiner). The first and second tethers 151A, 151B may be cables. Other materials for the first and second tethers 151A, 151B may include chains, plastic or metal arms, or any other type of support. The first and third fasteners 153A, 153C may couple to a first coupler 155A on the platform 141 and a second coupler 155B on the platform 141, respectively. The second and fourth fasteners 153B, 153D may be coupled to a third coupler 155C on the housing 104 and a fourth coupler 155D on the housing 104, respectively. Positioned on an upper surface of the housing 104 may be a grease panel 157 that prevents cooking particles from cooking devices sitting on the platform 141 from reaching gear on the upper frame 110.

Figure 7:
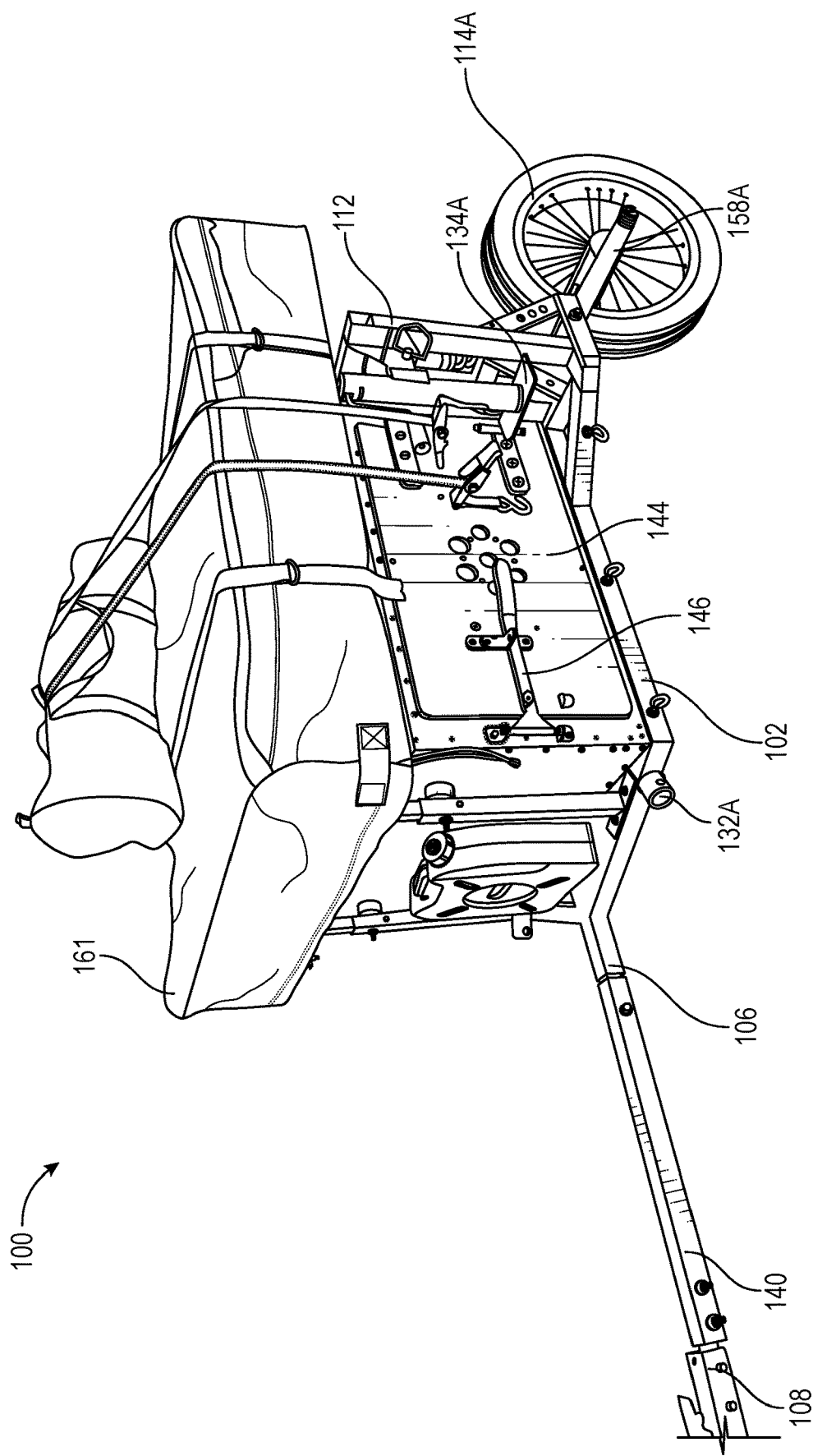
FIG. 7 illustrates a right, side perspective view of an off-road trailer.
Figure 8:
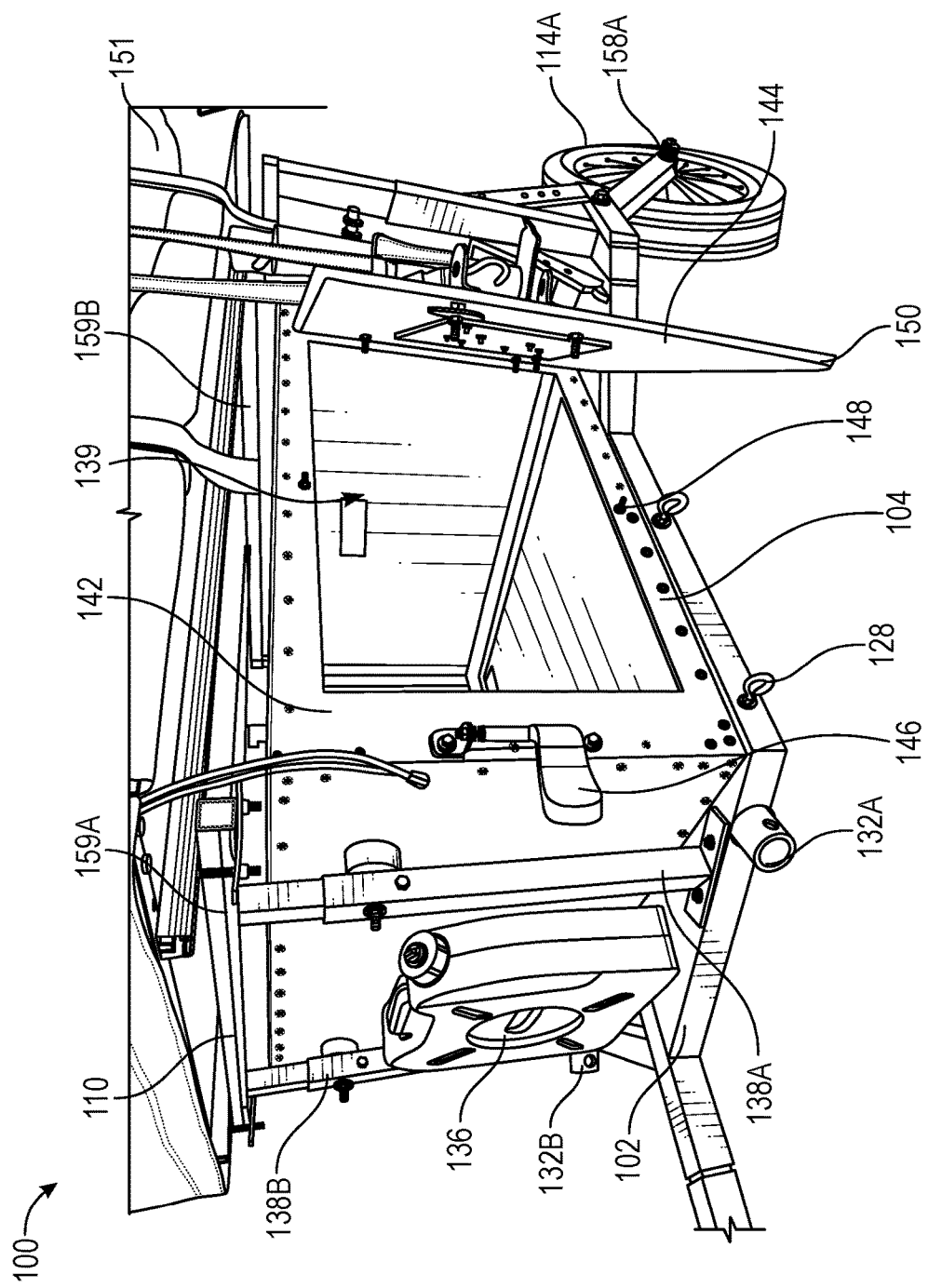
FIG. 8 illustrates a right, side perspective view of an off-road trailer.

As shown in FIGS. 7-8, on a side opposite the hingedly coupled platform 141, the housing 104 may include a door 144 that is hingedly coupled thereto that covers an opening into an interior compartment 139 of the housing 104 and a latch 146, such as a cam-action lockable door latch. In addition to the latch 146, door fasteners 148 (e.g., bolts and wing nuts) may be located on the housing 104 and configured to secure the door 144 to the housing 104. An inner edge of the door 144 may be circumscribed by a material 150 (e.g., rubber or foam) to assist in sealing the door 144. The upper frame 110 may be located above the housing 104 and comprise a first upper frame support 159A and a second upper frame support 159B. The upper frame 110 may be configured to receive gear 161, such as a pop-up tent, sleeping gear, or other types of gear. It will be appreciated that the platform 141 and the door 144 are not limited to being on a certain side of the housing 104. For example, the platform 141 may be on a rear of the housing 104.

Figure 9:
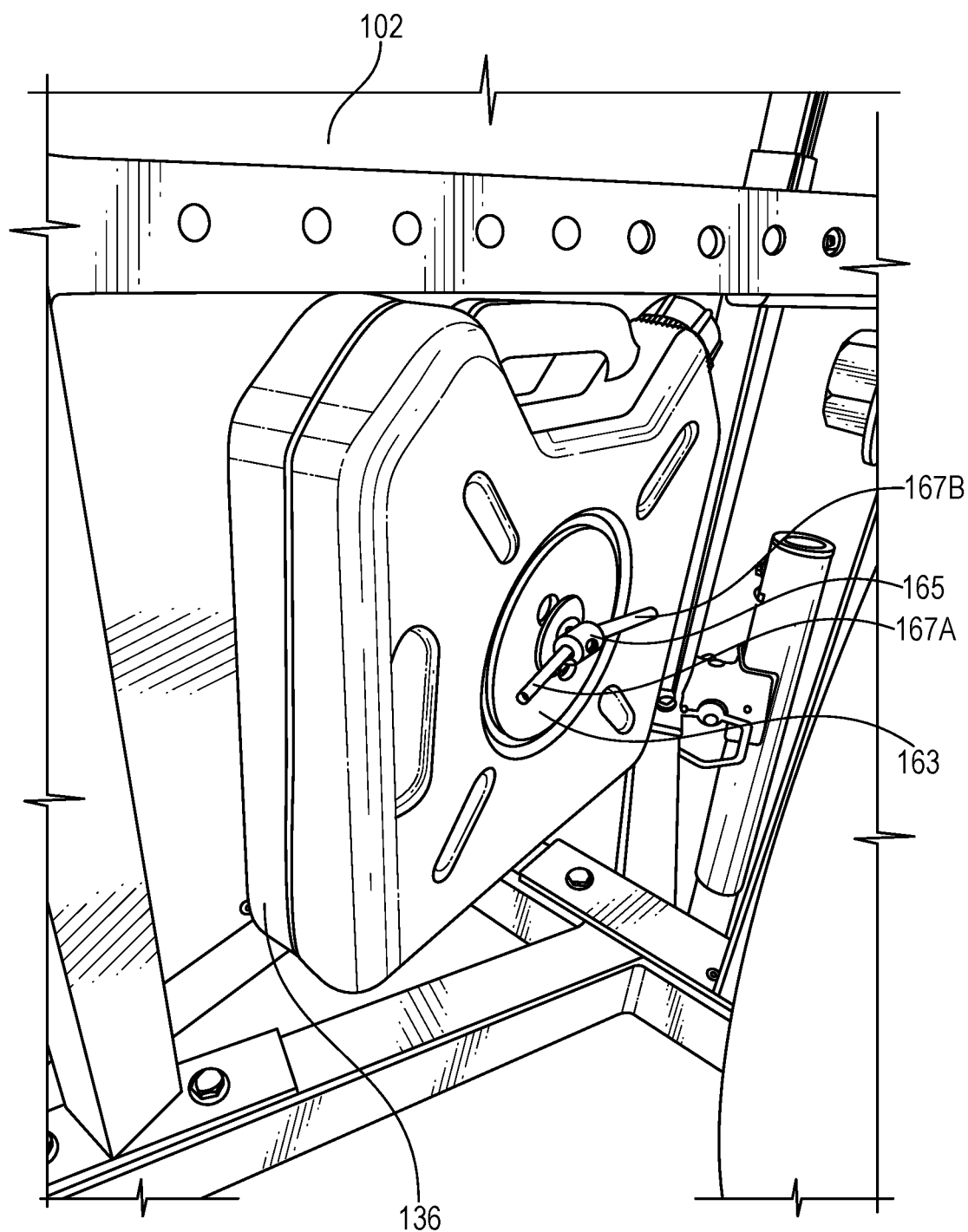
FIG. 9 illustrates a front, side perspective view of an off-road trailer.

As shown in FIG. 9, the fuel container 136 may be coupled to the housing 104 via a washer 163 and a container fastener 165. The container fastener 165 may be a tool less fastener, meaning that a user may remove the container fastener 165 by hand. In other embodiments, the container fastener 165 may be configured to receive a tool to be tightened or loosened. The container fastener 165 may comprise a first finger grip 167A and a second finger grip 167B to aid a user in securing or removing the container fastener 165.

Figure 10:
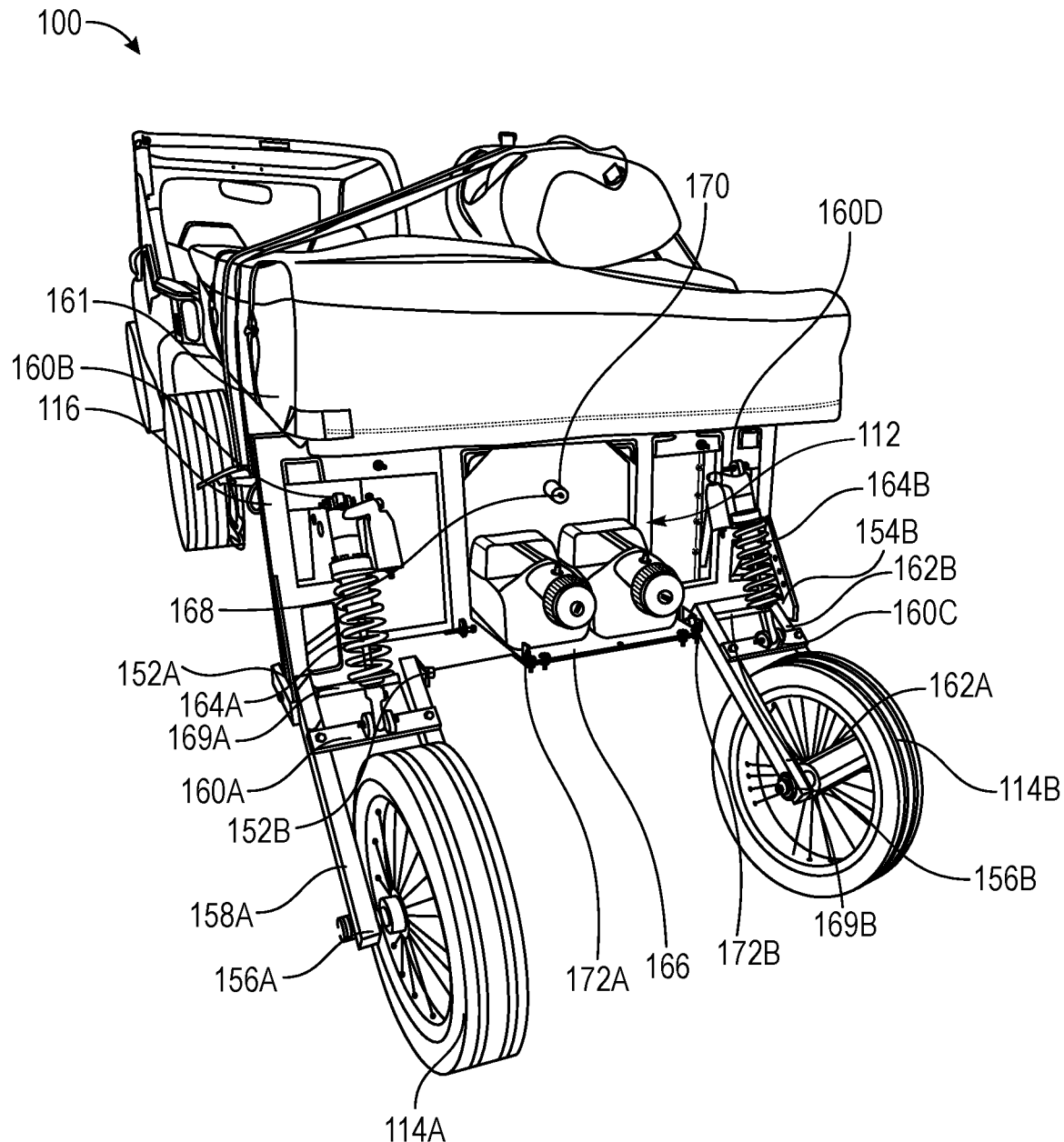
FIG. 10 illustrates a rear perspective view of an off-road trailer.
Figure 11:
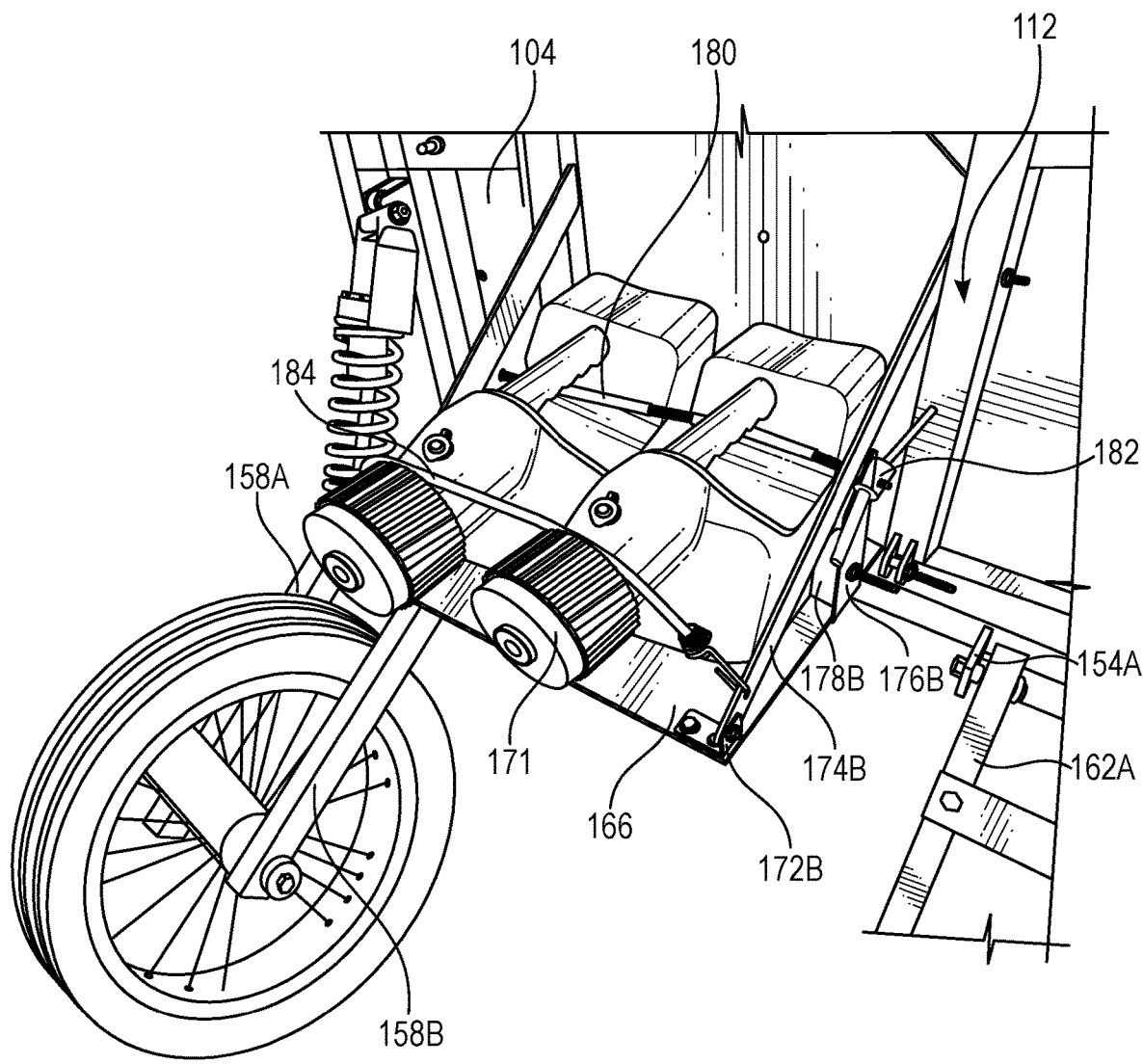
FIG. 11 illustrates a rear perspective view of an off-road trailer.
Figure 12:
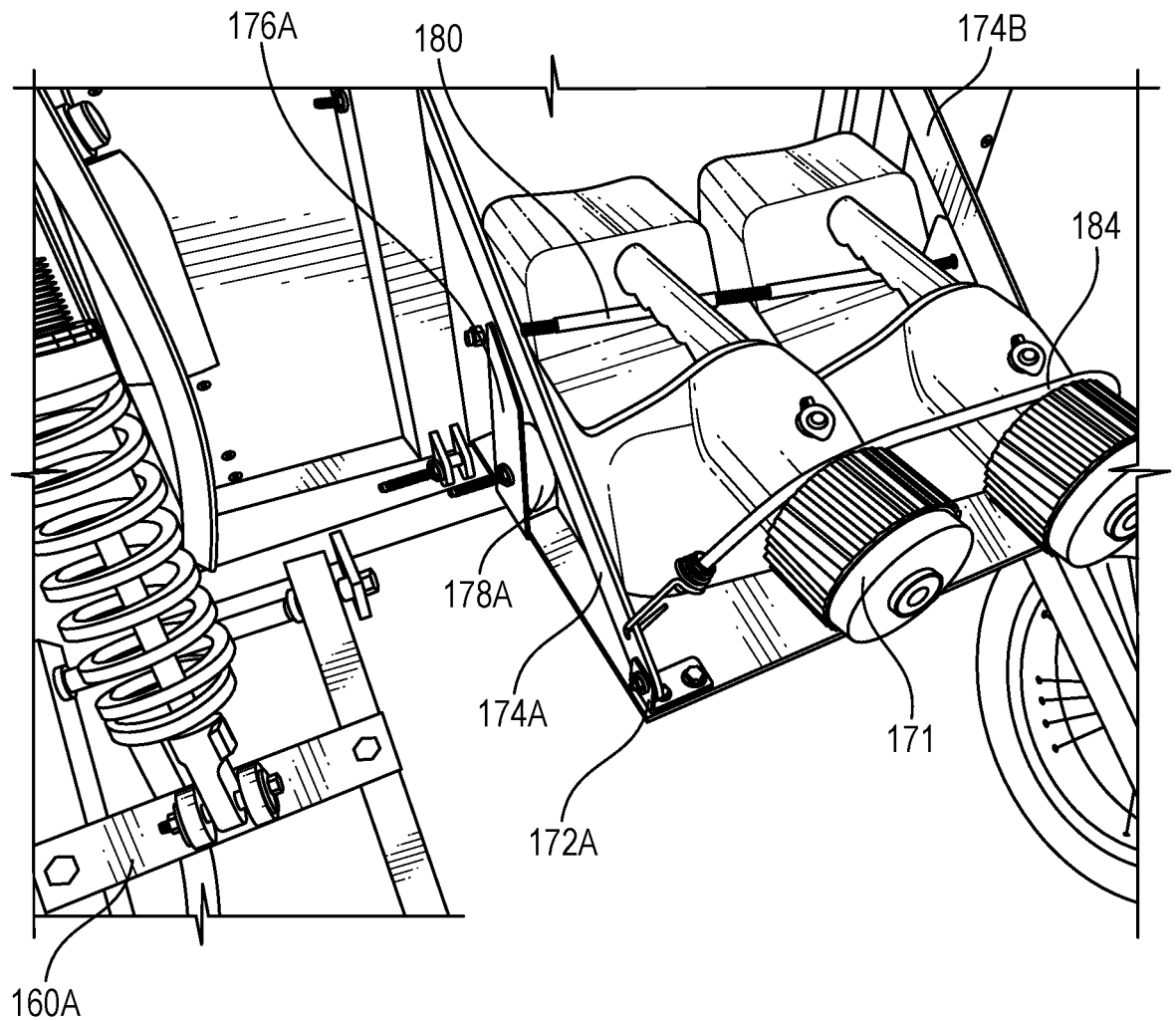
FIG. 12 illustrates a rear perspective view of an off-road trailer.

As shown in FIGS. 10-12, the rear frame 112 may be coupled to the main frame 116 and extend vertically therefrom so as to be proximate a rear side of the housing 104. The housing 104 may be coupled to the rear frame 112 with fasteners, such as bolts and nuts. The rear frame 112 provides additional strength and structural stability to the trailer 100, as well as a location to receive the wheels 114A, 114B. The rear frame and/or main frame 112, 116 may comprise a first and a second bracket 152A, 152B on a first side and a third and a fourth bracket 154A, 154B on a second side. The first and second brackets 152A, 152B may receive a first wheel structure 156A that includes a first arm 158A and a second arm 158B and a first wheel structure axle 169A may be positioned between the first and second arms 158A, 158B. The first and second arms 158A, 158B may extend outward from a rear of the main frame 116. Positioned between the first and second arms 158A, 158B is the first wheel 114A with a first axle. A first shock-absorbing bracket 160A may be coupled to the first and second arms 158A, 158B. A second shock-absorbing bracket 160B may be coupled to the rear frame 112 at the first side. The third and fourth brackets 154A, 154B may receive a second wheel structure 156B that includes a third arm 162A and a fourth arm 162B and a second wheel structure axle 169B may be positioned between the third and fourth arms 162A, 162B. The third and fourth arms 162A, 162B may extend outward from the rear of the main frame 116. Positioned between the third and fourth arms 162A, 162B is the second wheel 114B with a second axle. A third shock-absorbing bracket 160C may be coupled to the third and fourth arms 162A, 162B. A fourth shock-absorbing bracket 160D may be coupled to the rear frame 112 at the second side. The tires and wheels 114A, 114B may be off-road motorcycle tires, such as Harley Davidson® off-road wheels and tires. Other types of off-road tires may be used without departing herefrom, such as UTV or truck tires. The tires and wheels 114A, 114B may be heavy duty, meaning the tires and wheels 114A, 114B may withstand, for example, thousands of pounds of load and rocky terrain.

The trailer 100 may further comprise a first shock 164A coupled to the rear frame 112 at one end, the second shock-absorbing bracket 160B and the first shock-absorbing bracket 160A at an opposite end, and a second shock 164B coupled to the rear frame 112 at one end, the fourth shock-absorbing bracket 160D and the third shock-absorbing bracket 160C at an opposite end. The first and second shocks 164A, 164B may be adjustable shocks that can be adjusted based on terrain. The first and second shocks 164A, 164B may be capable of 12" of travel or more, which allows the trailer to traverse boulders, logs, etc. The first and second wheel structure axles 169A, 169B may allow the first and second wheels 114A, 114B to move up and down in conjunction with the first and second shocks 164A, 164B.

Furthermore, the rear frame 112 may comprise a hingedly coupled second platform 166 that may be folded up against and secured to the housing via a platform fastener 168 (e.g., bolt and wing nut). A spacer 170 may be positioned on the platform fastener 168 so as to be positioned between the housing 104 and platform 166 when the platform 166 is in an upright position. The spacer 170 may be made of rubber, which may assist in securing the platform 166 to the housing 104. The platform 166 may be configured to receive gear, such as water canisters 171 or any other type of gear. The platform 166 may include a first platform bracket 172A and a second platform bracket 172B, which may be coupled to platform supports 174A, 174B. The platform supports 174A, 174B may secure the platform 166. As such, the platform supports 174A, 174B are coupled to the first platform bracket 172A and the second platform bracket 172B, respectively, and the rear frame 112 and/or housing 104. The platform supports 174A, 174B may be coupled to the trailer 100 via couplers. In addition, the second platform 166 may comprise a third platform bracket 176A on one side of the platform 166 and a fourth platform bracket 176B on a side of the platform 166 opposite the third platform bracket 176A. The third platform bracket 176A may receive a first spacer 178A that is coupled to the third platform bracket 176A. The first spacer 178A may be positioned between the water canisters 171 and the third platform bracket 176A. The fourth platform bracket 176B may receive a second spacer 178B that is coupled to the fourth platform bracket 176B. The second spacer 178B may be positioned between the water canisters 171 and the fourth platform bracket 176B. The third and fourth platform brackets 176A, 176B may also receive a rod 180 or any other type of securement device. The rod 180 may pass from the third platform bracket 176A to the fourth platform bracket 176B and secured via a bracket fastener 182. The rod 180 may comprise threads that mate with the bracket fastener 182. Further, a gear fastener 184 may be placed over the gear or water canisters 171 and coupled to the platform supports 174A, 174B. The gear fastener 184 may be a stretchable material or a non-stretchable material.

Figure 13:
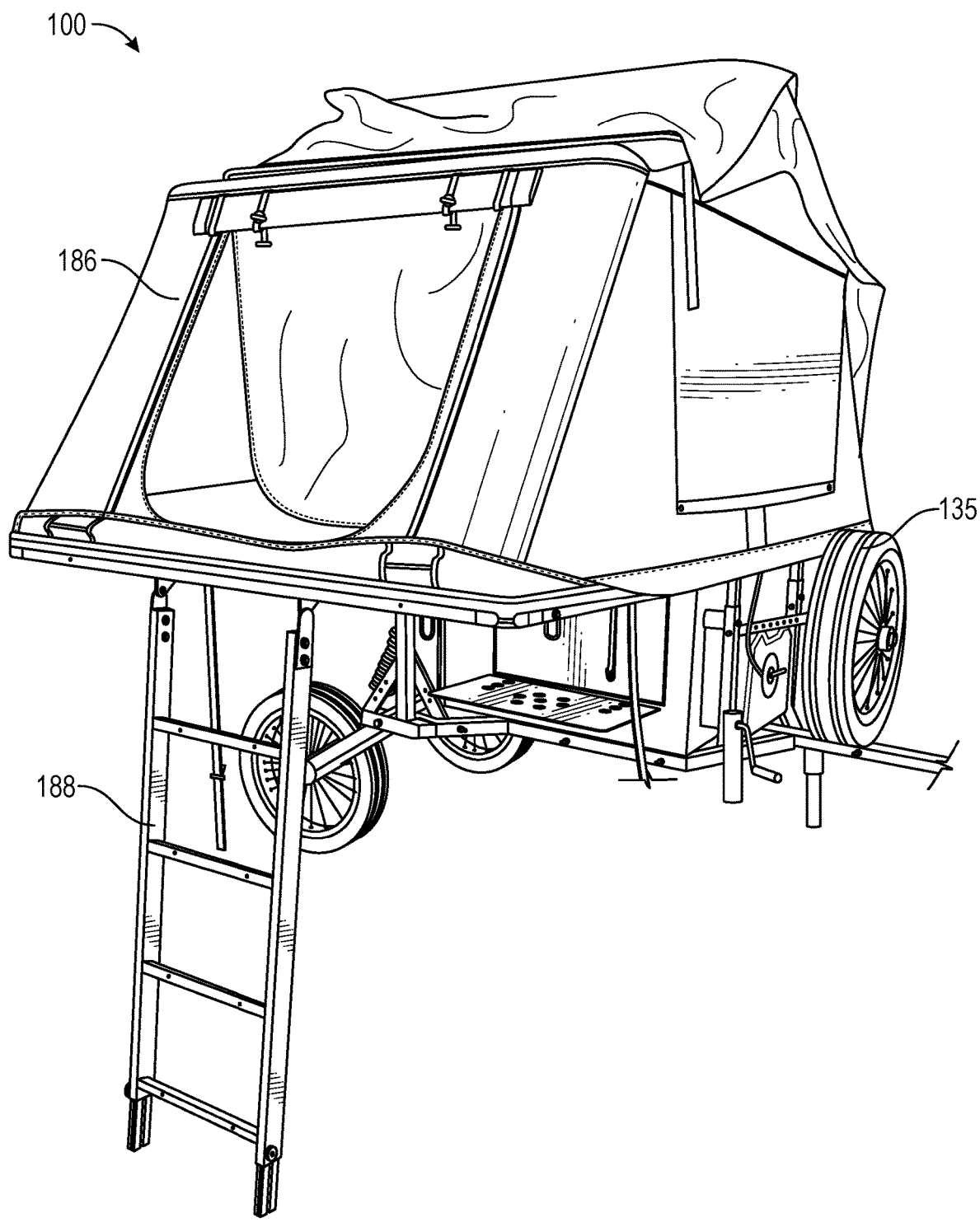
FIG. 13 illustrates a left, side perspective view of an off-road trailer.

As shown in FIG. 13, the trailer 100 may be configured to receive a pop-up tent 186 with a ladder 188.

The trailer 100 may vary in length and width. For example, the trailer 100 may be 50" to be compatible with Forest Service trails that have width limits. In other embodiments, the trailer 100 may be 65" in width to accommodate larger side-by-side vehicles. The trailer 100 may be manufactured in a variety of widths, as well as lengths. It will be appreciated that the trailer 100 is light weight and capable of traversing numerous types of terrain. Due to less components and its configuration, the trailer 100 may be less expensive to manufacture than many other similar types of trailers on the market.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. An off-road trailer comprising:
   a lower frame;
   a housing positioned on the lower frame, the housing comprising:
   a first platform coupled to a side of the housing via one or more hinges, wherein the first platform moves from a secured, vertical position, being secured to a platform spacer on the side of the housing with a platform fastener, to a resting, horizontal position; and
   a door that provides access to an opening in the housing, the door comprising a latch and door fasteners to secure the door to the housing;
   an extendible trailer tongue coupled to and extending from the lower frame, the extendible trailer tongue comprising a tongue member that is removably attachable to the off-road trailer to increase or decrease the length of the extendible trailer tongue;
   a ball hitch receiver coupleable to the extendible trailer tongue;
   an upper frame positioned above an upper surface of the housing;
   a rear frame attached to the lower frame; and
   at least two wheels.

* * * * *